(12) United States Patent
Newton et al.

(10) Patent No.: US 6,214,943 B1
(45) Date of Patent: Apr. 10, 2001

(54) NOZZLE FOR ATOMIZING A FLUID IN A FLUIDIZED BED

(75) Inventors: David Newton, Guildford; Michael Bernard Power, London, both of (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/299,884

(22) Filed: Apr. 27, 1999

Related U.S. Application Data (63) Continuation of application No. PCT/GB97/02931, filed on Oct. 22, 1997.

(30) Foreign Application Priority Data

Oct. 31, 1996 (GB) .................................................. 9622715

(51) Int. Cl.$^7$ ....................................................... C08F 2/34
(52) U.S. Cl. ................................ 526/68; 526/64; 526/67; 526/88; 526/901; 239/1; 239/8; 261/78.2
(58) Field of Search .................................. 526/64, 67, 68, 526/88, 901; 239/1, 8, 13, 568; 261/78.2; 137/1, 13

(56) References Cited

U.S. PATENT DOCUMENTS 3,628,734   12/1971   Lindell et al. .
4,238,453   12/1980   Van den Bossche .
5,804,677 * 9/1998   Chinh et al. ............................ 526/68

FOREIGN PATENT DOCUMENTS 0 173 261    3/1986   (EP) .
WO 97/18888  5/1997   (WO) .

* cited by examiner

Primary Examiner—Fred Teskin
(74) Attorney, Agent, or Firm—Finnegan, Henderson, Farabow, Garrett & Dunner, L.L.P.

(57) ABSTRACT

A continuous gas fluidized bed process for the polymerization of olefins, especially ethylene, propylene, or mixtures thereof with other alpha-olefins by cooling the recycle gas stream to condense some liquid (e.g., a comonomer), separating at least part of the liquid and spraying it under pressure through a nozzle (1) directly into the fluidized bed by pressurizing the liquid and feeding it to a spray nozzle (1) having a mechanical device (6) for atomizing the liquid, under conditions such that the spray is formed within a spray-forming zone (5) of the nozzle outlet. The spray-forming zone (5) is preferably shielded from the fluidized bed particles by a wall or walls which can be, for example, a tube or a plate. Also described is a nozzle having two or more series of outlets, each series being fed and controlled independently to enable improved turn-up/turn-down of the liquid supply to the bed.

16 Claims, 6 Drawing Sheets

FIG. 1

LIQUID

NOZZLE FOR ATOMIZING A FLUID IN A FLUIDIZED BED

This application is a continuation of International Application No. PCT/GB97/02931, filed Oct. 22, 1997, the content of which is incorporated herein by reference.

BACKGROUND OF THE INVENTION

The present invention relates to a nozzle suitable for use for the injection of liquid into a fluidised bed in a continuous process for the gas-phase polymerisation of olefins, and in particular to a nozzle which allows for improved control of injection of liquid into said fluidised bed.

Processes for the homopolymerisation and copolymerisation of olefins in the gas phase are well known in the art. Such processes can be conducted for example by introducing the gaseous monomer into a stirred and/or fluidised bed comprising polyolefin and a catalyst for the polymerisation.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of preformed polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and the polymer particles would eventually commence to fuse. In the fluidised bed polymerisation of olefins, a commonly used method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, a diluent gas or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the afore-mentioned type is restricted by the maximum rate at which heat can be removed from the reactor. The rate of heat removal can be increased, for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for increasing the heat removal capacity of the recycle stream, for example, by introducing a volatile liquid.

GB 1415442 relates to the gas phase polymerisation of vinyl chloride in a stirred or fluidised bed reactor, the polymerisation being carried out in the presence of at least one gaseous diluent having a boiling point below that of vinyl chloride. Example 1 of this reference describes the control of the temperature of polymerisation by the intermittent addition of liquid vinyl chloride to fluidised polyvinyl chloride material. The liquid vinyl chloride evaporated immediately in the bed resulting in the removal of the heat of polymerisation.

U.S. Pat. No. 3,625,932 describes a process for polymerisation of vinyl chloride wherein beds of polyvinyl chloride particles within a multiple stage fluidised bed reactor are kept fluidised by the introduction of gaseous vinyl chloride monomer at the bottom of the reactor. Cooling of each of the beds to remove heat of polymerisation generated therein is provided by spraying liquid vinyl chloride monomer into the ascending gas stream beneath the trays on which the beds are fluidised.

FR 2215802 relates to a spray nozzle of the non-return valve type, suitable for spraying liquids into fluidised beds, for example in the gas fluidised bed polymerisation of ethylenically unsaturated monomers. The liquid, which is used for cooling the bed, can be the monomer to be polymerised, or if ethylene is to be polymerised, it can be a liquid saturated hydrocarbon. The spray nozzle is described by reference to the fluidised bed polymerisation of vinyl chloride.

GB 1398965 discloses the fluidised bed polymerisation of ethylenically unsaturated monomers, especially vinyl chloride, wherein thermal control of the polymerisation is effected by injecting liquid monomer into the bed using one or more spray nozzles situated at a height between 0 and 75% of that of the fluidised material in the reactor.

U.S. Pat. No. 4,390,669 relates to homo- or copolymerisation of olefins by a multi-step gas phase process which can be carried out in stirred bed reactors, fluidised bed reactors, stirred fluidised bed reactors or tubular reactors. In this process polymer obtained from a first polymerisation zone is suspended in an intermediate zone in an easily volatile liquid hydrocarbon, and the suspension so obtained is fed to a second polymerisation zone where the liquid hydrocarbon evaporates. In Examples 1 to 5, gas from the second polymerisation zone is conveyed through a cooler (heat exchanger) wherein some of the liquid hydrocarbon condenses (with comonomer if this is employed). The volatile liquid condensate is partly sent in the liquid state to the polymerisation vessel where it is vaporised for utilisation in removing the heat of polymerisation by its latent heat of evaporation.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. The specification of EP 89691 states that a primary limitation on the extent to which the recycle gas stream can be cooled below the dew point is in the requirement that the gas-to-liquid ratio be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP 173261 relates to a particular means for introducing a recycle stream into fluidised bed reactors and, in particular, to a means for introducing a recycle stream comprising a two phase mixture of gas and entrained liquid as described in EP 89691 (supra).

WO 94/25495 describes a fluidised bed polymerisation process comprising passing a gaseous stream comprising monomer through a fluidised bed reactor in the presence of a catalyst under reactive conditions to produce polymeric product and a stream comprising unreacted monomer gases, compressing and cooling said stream, mixing said stream with feed components and returning a gas and liquid phase to said reactor, a method of determining stable operating conditions which comprises: (a) observing fluidised bulk density changes in the reactor associated with changes in the composition of the fluidising medium, and (b) increasing the cooling capacity of the recycle stream by changing the composition without exceeding the level at which a reduction in the fluidised bulk density or a parameter indicative thereof becomes irreversible.

U.S. Pat. No. 5,436,304 relates to a process for polymerising alpha-olefin(s) in a gas phase reactor having a fluidised bed and a fluidising medium wherein the fluidising medium serves to control the cooling capacity of the reactor and wherein the bulk density function (Z) is maintained at a value equal to or greater than the calculated limit of the bulk density function.

Published application WO 94/28032 which by reference is incorporated herein, relates to a continuous gas phase fluidised bed process in which the productivity of the process is improved by cooling the recycle gas stream to a temperature sufficient to form a liquid and a gas, separating the liquid from the gas and feeding the separated liquid directly to the fluidised bed. The liquid may be suitably injected into the fluidised bed by means of one or more nozzles arranged therein. It has now been found that by using a particular nozzle design in such a process liquid can be more effectively introduced into the fluidised bed which results in improved control over the cooling of the fluidised bed owing to improved liquid distribution within the nozzle spray zone(s). Further benefits include a reduction in nozzle purge gas requirements and significant operational cost reductions.

SUMMARY OF THE INVENTION

Thus, according to the present invention there is provided a continuous gas fluidised bed process for the polymerisation of olefin monomer selected from (a) ethylene, (b) propylene, (c) mixtures of ethylene and propylene and (d) one or more other alpha-olefins mixed with (a), (b) or (c), in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing at least part of the separated liquid directly into the fluidised bed by:

(a) pressurising the liquid;
(b) feeding the pressurised liquid to a liquid inlet of a nozzle; and
(c) discharging the liquid into the fluidised bed through an outlet of the nozzle in which the liquid is atomised using a mechanical device positioned within the outlet and an atomised spray is formed within a spray-forming zone of the outlet.

It was found that it in the absence of a spray-forming zone the liquid cannot penetrate far into the fluidised bed and the subsequent build-up of liquid around the nozzle results in defluidisation of the bed in the region of the nozzle. It is believed that atomisation of the liquid and formation of a spray is inhibited by the presence of the solids of the fluidised bed at or near the outlet of the nozzle. The spray-forming zone is shielded from the fluidised bed thereby allowing the atomisation process to proceed and the spray to develop.

DETAILED DESCRIPTION OF THE INVENTION

The spray-forming zone of the outlet may be located within the nozzle, or may be a zone associated with a member protruding from, or secured in spatial relationship to, the nozzle.

The spray-forming zone comprises a shielded path along which the liquid travels as the atomisation proceeds and the spray develops. The spray-forming zone is preferably defined by a wall which can be an integral part of the nozzle, or can protrude from the nozzle, or can be secured in spatial relationship to the nozzle. The wall can comprise, for example, a tube or a plate. In the case that the wall is tubular, the cross-section can be, for example, circular, rectangular, square, triangular, hexagonal or elliptical. The tubular wall can have uniform or non-uniform internal cross-section throughout its length. For example, the cross-section can be generally circular cylindrical, elliptic cylindrical, frustro-conical, frustro-pyramidal, an ellipsoidal section, single sheet hyperboloidal, bell-shaped or horn-shaped. Preferably the tubular wall has increasing cross-section in the direction of flow of the liquid spray. In the case that the wall comprises a plate, the plate can be planar or curved, for example, a flat plate, an angled plate, a dished plate, a trough-shaped plate, a helically-shaped plate or a spirally shaped plate.

The spray-forming zone of the outlet should be at least 10 mm in length, preferably at least 25 mm in length in order for the spray to develop and to be adequately shielded from the bed.

The nozzle may be positioned within the fluidised bed or may protrude through the walls of the reactor so that the outlet of the nozzle is in communication with the fluidised bed (preferably with the associated pipework located externally to the reactor).

The nozzle may have a single outlet or a plurality of outlets.

Where the nozzle is positioned within the fluidised bed the preferred number of outlets is 1 to 4, more preferably 2 to 4.

Where the nozzle protrudes through the walls of the reactor the preferred number of outlets is 1 to 20. It is believed that such nozzles have a different spray profile (a wider spray angle) than nozzles positioned within the fluidised bed and that this may require more outlets of smaller cross-sectional area.

The outlet(s) may comprise circular holes, slots, ellipsoids or other suitable configurations. Preferably, where the outlet (s) are slots they are elliptical in shape.

Where the outlet(s) are slots, the slots may typically have a width in the range 2.5 to 12 mm and a length in the range 8 to 50 mm. The cross-sectional area of the slots may be in the range from 26 to 580 $mm^2$.

Where the outlet(s) are circular holes, the diameter of the holes may be in the range 5 to 25 mm. The cross-sectional area of the circular holes may be in the range 19.6 to 491 $mm^2$.

It is important that the outlet(s) of the nozzle are of sufficient size to allow for the passage of any fines which may be present in the separated liquid stream.

Where the nozzle has a plurality of outlets these may be arranged at different levels within the nozzle, for example, the outlets may be arranged in a number of rows around the circumference of the nozzle. The preferred number of outlets for each row is 1 to 8, more preferably 1 to 4.

The plurality of outlets are preferably equally spaced around the circumference of the nozzle.

Where the plurality of outlets are arranged in rows around the circumference of the nozzle it is preferred that the outlets of each adjacent row are off-set from one another.

The mechanical device may suitably be any mechanical device which imparts a flow pattern to the liquid adapted to promote atomisation of the liquid. Preferred mechanical devices are those which provide a broad spray profile and a reasonably uniform droplet size. Known mechanical devices for atomising liquids such as water (for fire suppression) and paints (for coating purposes) can be employed if desired. The energy for the atomisation can be provided, for example, by the pressure drop of the liquid emerging from an orifice, or using external means such as electrical or mechanical power. Suitable mechanical devices for atomising the liquid include, for example, swirl devices or baffle plates to impart turbulent flow patterns in the liquid to promote disruption and atomisation of the liquid as it emerges from an orifice impingement devices, fan devices and ultrasonic devices. A simple form of mechanical device which is capable of generating a spray comprises a uniform cylindrical tube having an inlet for pressurised liquid and a plain outlet from which a liquid jet emerges. As the jet moves away from the outlet it gradually breaks up into droplets forming a liquid spray. A simple system of this type can be employed in the present invention provided the dimensions of the tube and the pressure of the liquid are adjusted to provide a satisfactory spray structure. However, with this type of system the liquid jet tends to travel substantial distances before breaking up into spray droplets, and the spray so-formed may not necessarily have the desired structure. It is therefore preferred in the present invention to augment the production of the spray by the use of supplementary means, for example, baffles located in the liquid stream leading to the outlet, or impingement devices which break up a liquid jet into a spray.

Preferably the spray is introduced, from the spray-forming zone of the outlet, directly into the fluidised bed above the upper limit of the temperature gradient between the entering fluidising gas (the gaseous stream fed to the reactor) and the remainder of the bed. Commercial processes for the gas fluidised bed polymerisation of olefins are generally operated under substantially isothermal, steady state conditions. However, although almost all of the fluidised bed is maintained at the desired substantially isothermal polymerisation temperature, there normally exists a temperature gradient in the lower region of the bed. This temperature gradient arises due to the fact that the recycle gas used to fluidise the bed is normally cooled to a temperature well below the temperature prevailing in the bulk of the bed. Under these circumstances, the region of the bed immediately above the point of introduction of the cooled gas stream into the bed is cooler than the bulk of the bed. The lower temperature limit of this region wherein the temperature gradient exists is the temperature of the incoming cool gas stream, and the upper limit is the substantially isothermal bed temperature (ie the temperature of the bulk of the bed). In commercial reactors of the type which employ a fluidisation grid, and have a fluidised bed height typically of about 10 to 20 m, this temperature gradient normally exists in a layer of about 15 to 30 cm (6 to 12 inches) above the grid.

A single nozzle may be used or a plurality of nozzles may be arranged within the fluidised bed or protruding through the walls of the reactor.

A preferred arrangement is to provide a plurality of nozzles substantially equally spaced within the fluidised bed on a given pitch circle diameter or equally spaced around the circumference of the reactor in the region of the introduction of the liquid. The number of nozzles used is that number which is required to provide sufficient penetration and dispersion of the spray at each nozzle to achieve good dispersion of liquid across the bed. A preferred number of nozzles is 1 to 8, more preferably 1 to 4, most preferably four for nozzles located within the bed or 4 to 8 for externally located nozzles.

Each of the nozzles may, if desired, be supplied with pressurised separated liquid by means of a common conduit suitably arranged within the reactor. This can be provided, for example, by means of a conduit passing up through the centre of the reactor.

Each nozzle may have a series of outlets arranged in groups circumferentially around the nozzle with each group of outlets connected separately to a supply of pressurised liquid. Typically the groups of outlets may be arranged in a number of rows around the circumference of the nozzle. The preferred number of groups of outlets is two.

In a preferred arrangement the nozzle has two groups of outlets arranged in two rows with each group being offset from one another. In this way the liquid discharged from the lower group will not interfere with the discharge from the upper group.

Preferably, each group of outlets is connected separately with the supply of pressurised liquid to the nozzle by means of appropriate pipework arranged within the nozzle. The supply of pressurised liquid to each group of outlets may be controlled by the use of suitably arranged valves. In this way the supply of liquid to each group of outlets may be controlled in order to control the amount of liquid being discharged from the nozzle. For example, it is possible to direct liquid only to the group of outlets arranged at the top of the nozzle. This ability to control the amount of liquid discharged from the nozzle is particularly important during start up of the fluidised bed process. Also the ability to reduce or increase the amount of liquid entering the fluidised bed allows for greater control and flexibility during the operation of the fluidised bed.

The nozzles used in the process of the present invention are preferably arranged such that they protrude substantially vertically into the fluidised bed, but may be arranged such that they protrude from the walls of the reactor in a substantially horizontal direction.

The rate at which liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts. Thus, for example, when catalysts having very high activity are employed, and high production rates are desired, the rate of liquid addition will be high. Typical rates of liquid introduction may be, for example, in the range 0.1 to 4.9, preferably 0.3 to 4.9 cubic meters of liquid per cubic meter of bed material per hour. For conventional Ziegler catalysts of the "superactive" type (i.e. those based on transition metal, magnesium halide and organometallic cocatalyst, the rate of liquid addition may be, for example, in the range 0.5 to 1.5 cubic meters of liquid per cubic meter of bed material per hour. Catalysts based on certain transition metal complexes, for example, metallocenes activated with, for example, alkyl alumoxanes, are known to have extremely high activities. The increased rates of heat evolution accompanying the use of such polymerisation catalysts can render the use of the process of the present invention particularly desirable. The addition of liquid to a gas fluidised bed in accordance with the present invention can provide a reduction in the occurrence of hot spots generated in the reactor by introduction of fresh highly active catalyst. If desired, the catalyst itself can be introduced as a suspension or solution in the liquid which is sprayed into the bed. By the injection of liquid into the fluidised bed in this way any catalyst which is introduced in the liquid may benefit from the localised cooling effect of the liquid surrounding the nozzle which may avoid hot spots and consequent agglomeration.

It is important in the process of the present invention to achieve good dispersion and penetration of the liquid in the fluidised bed. Factors which are important in achieving good penetration and dispersion are the momentum and direction of the spray of atomised liquid entering the bed (the spray profile), the number of nozzles per unit cross-sectional area of the bed, and the spatial arrangement of the nozzles.

Preferably, the walls of the spray-forming zone are chamfered so that the spray adopts a suitable spray profile. For example, if the walls of the spray-forming zone diverge at an angle of 60° in the horizontal plane of the fluidised bed the spray will cover an angle of approximately 60° in the horizontal plane of the bed.

The atomised liquid spray is preferably injected into the bed in a substantially horizontal direction. In the case that the outlets deliver the atomised liquid spray in a direction other than horizontal, preferably the direction of the atomised liquid spray is at an angle not greater than 45°, most preferably not more than 20° to the horizontal.

In the spray zone of the nozzle the liquid loadings in the bed may be from 16 to 656 m³ liquid/h/m³ of the nozzle spray zone and the liquid addition rate to the fluidised bed may be in the range 50 to 300 te/h.

Preferably, the nozzle has a liquid flux rate, for the typical outlet cross-sectional areas described above and for liquid addition rates of between 50 and 300 te/h, in the range 1.5 to 200 m³ liquid/s/m² outlet cross-sectional area, more preferably 9.5 to 70 m³ liquid/s/m² outlet cross-sectional area wherein the nozzle liquid flux rate is defined as the volumetric flow rate of liquid (m³/s) per unit cross-sectional area (m²) of the outlets from which the atomised liquid spray emerges.

The pressure drop over the nozzle must be sufficient to prevent the ingress of particles from the fluidised bed. The pressure drop is suitably in the range 0.5 to 100 bar, more preferably in the range 0.5 to 70 bar and most preferably in the range 0.5 to 30 bar. The pressure drop over the nozzle also provides a means for controlling the rate of flow of liquid through the nozzle.

The mass flow rate of liquid passing through the mechanical device positioned within the outlet(s) of the nozzle is related to the pressure drop over the mechanical device. The following "Equation 1" provides a reasonably accurate means of determining the effect that a change in the pressure applied to the liquid has on the rate of flow of liquid:

$$m_2/m_1 = \sqrt{[\Delta P_2/\Delta P_1]} \qquad \text{Equation 1}$$

where $\Delta P_1$ is the pressure drop of the mechanical device at a liquid flow rate $m_1$ and $\Delta P_2$ is the pressure drop of the mechanical device at a higher liquid flow rate $m_2$, such that $m_2 > m_1$.

The data given in Table 1 relates the pressure drop and liquid flow rate for a typical mechanical device which starts to atomise the liquid at a liquid flow rate of 0.4 m³/h and a pressure drop of 0.5 bar.

TABLE 1

| Pressure drop | Liquid flow rate (Liquid density = 620 kg/m³) | | Ratio of liquid flow rate at ΔP₂ to liquid flow rate at 0.5 bar |
| --- | --- | --- | --- |
| | m³/h | kg/h | (Turn-up ability) |
| 0.5 | 0.40 | 248 | 1.0 |
| 10 | 1.8 | 1116 | 4.5 |
| 30 | 3.12 | 1934 | 7.75 |
| 100 | 5.70 | 3532 | 14.14 |

In order to increase the flow rate of liquid passing through the mechanical device the pressure drop over the mechanical device must be increased in accordance with Equation 1. It is desirable to have an ability to turn-up/turn-down (ie to increase or reduce) the amount of liquid flowing through the mechanical device. In order to have a reasonable turn-up/ turn-down ability the pressure drop over the typical mechanical device of Table 1 needs to be in the range 0.5 to 100 bar (over which range the turn-up ability is from 1 to 14.24). However, high pressure drops are undesirable because of the costs involved in pressurising the liquid to high pressures, for example, increased pumping costs and the need for high pressure liquid lines and safety devices.

For economic reasons it is desirable to minimise the number of nozzles, the number of mechanical devices in each nozzle as well as the pressure drop over the mechanical devices whilst maintaining adequate liquid spray profiles and turn-up/turn-down ability of each nozzle.

It has now been found that the lower operating limit of a typical mechanical device (0.5 bar pressure drop) can be extended if a small amount of gas is introduced into the liquid before the liquid passes through the mechanical device (hereinafter termed operating in an effervescent mode).

Under normal process conditions, the mechanical device of such effervescent nozzles may be designed to operate at a moderate pressure drop of, for example, 30 bar with the range of operation (i.e. turn-down) being extended to below 0.5 bar where the nozzle operates in the effervescent mode. This allows good control of the amount of liquid introduced into the fluidised bed during start-up of the process where it is may be required to introduce small amounts of liquid into the bed i.e. well below the capability of the nozzle to atomise the liquid under non-effervescent conditions.

Examples of gases which can be introduced into the liquid when it is desired to operate in effervescent mode are the monomer gases undergoing polymerisation, for example, ethylene or propylene, or inert gases, for example, nitrogen or argon.

Preferably, the amount of gas used in such effervescent nozzles is in the range 0.5 to 10 percent by weight, based on the total weight of gas and liquid passing through the nozzle.

Suitably, the pressure of the gas is from 1 to 5 bar above the pressure of the liquid.

Preferably, the gas is introduced into the pressurised liquid through small holes in the liquid supply line to the nozzle so that small bubbles of gas are formed in the pressurised liquid. It is believed that as the bubbles of gas pass through the outlet(s) of the nozzle, the pressure drop over the nozzle outlet(s) causes the bubbles to expand thereby increasing the fragmentation and atomisation of the liquid.

The nozzles used in the process of the present invention may be provided with an emergency gas purge to prevent blockage of the nozzle by the ingress of particles from the fluidised bed should there be an interruption of the supply of pressurised liquid to the nozzle. Purge gases are selected from any gas which does not deleteriously affect the process. Preferred purge gases are the monomer gases undergoing polymerisation, for example, ethylene or propylene, or inert gases, for example, nitrogen or argon.

The gaseous recycle stream withdrawn from the reactor comprises unreacted gaseous monomers, and optionally, inert hydrocarbons, inert gases such as nitrogen, reaction activators or moderators such as hydrogen, as well as entrained catalyst and/or polymer particles.

The recycled gaseous stream fed to the reactor additionally comprises sufficient make-up monomers to replace those monomers polymerised in the reactor.

The process according to the present invention is suitable for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example 9 to 18 carbon atoms, can be employed if desired. Thus, it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene or propylene monomer, or as partial replacement for the $C_3$–$C_8$ alpha-olefin comonomer are dec-1-ene and ethylidene norbornene.

When the process is used for the copolymerisation of ethylene or propylene with higher alpha-olefins the ethylene or propylene is present as the major component of the copolymer, and preferably is present in an amount at least 70%, more preferably at least 80% by weight of the total monomers/comonomers.

The process according to the present invention may be used to prepare a wide variety of polymer products for example linear low density polyethylene (LLDPE) based on copolymers of ethylene with butene, 4-methylpent-1 -ene or hexene and high density polyethylene (HDPE) which can be for example, homopolyethylen or copolymers of ethylene with a small portion of higher alpha olefin comonomer, for example, butene, pent-1-ene, hex-1-ene or 4-methylpent-1-ene.

The liquid which condenses out of the gaseous recycle stream can be a condensable monomer, e.g. butene, hexene, or octene used as a comonomer for the production of LLDPE or may be an inert condensable liquid, e.g. butane, pentane, or hexane.

In this specification, the term "condensable" means that the dew point of the gaseous composition comprising the condensable material is above the lowest temperature of the recycle loop.

It is important that the atomised liquid should vaporise within the bed under the polymerisation conditions being employed so that the desired cooling effect is obtained and to avoid substantial accumulation of liquid within the bed.

The process is particularly suitable for polymerising olefins at a pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also suitable for use with metallocene catalysts and Ziegler catalysts supported on silica.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

Preferably, substantially the whole of the gaseous recycle stream is cooled and the condensed liquid is separated and substantially the whole of the separated liquid is introduced directly into the fluidised bed via the nozzle(s) as an atomised liquid spray.

The gaseous recycle stream is suitably cooled by means of a heat exchanger or exchangers to a temperature such that liquid is condensed in the gaseous recycle stream. Suitable heat exchangers are well known in the art.

The gaseous recycle stream leaving the top of the reactor can entrain a quantity of catalyst and/or polymer particles (fines) and these may be removed, if desired, from the gaseous recycle stream by means of a cyclone. A small proportion of these particles may remain entrained in the gaseous recycle stream and after cooling and separating the liquid from the gas, the fines can, if desired, be reintroduced into the fluidised bed together with the separated liquid stream via the nozzle(s).

In order to avoid fouling of the nozzle(s), it is important to ensure that the mechanical device positioned within the outlet(s) has sufficient clearance to allow for passage of any fines which may be present in the separated liquid stream. Furthermore, the outlet(s) from the nozzle(s) must be of sufficient size to allow the fines to pass into the fluidised bed together with the liquid spray.

The gaseous recycle stream may also comprise inert hydrocarbons used for the injection of catalyst, reaction activators or moderators into the reactor.

Make-up monomers, for example, ethylene to replace monomers consumed by the polymerisation reaction may be added to the gaseous recycle stream at any suitable location.

Make-up condensable comonomers, for example, butene, hexene, 4-methylpent-1-ene and octene, to replace condensable comonomers consumed by the polymerisation reaction may be introduced as liquids and added to the gaseous recycle gas stream at any suitable location.

The liquid may be separated from the gaseous recycle stream in a separator.

Suitable separators are for example cyclone separators, large vessels which reduce the velocity of the gas stream to effect separation of the condensed liquid (knock-out drums), demister type gas-liquid separators and liquid scrubbers, for example, venturi scrubbers. Such separators are well known in the art.

The use of a demister type of gas-liquid separator is particularly advantageous in the process of the present invention.

The use of a cyclone separator in the recycle gaseous stream, prior to the separator is preferred. This removes the majority of the fines from the gaseous stream leaving the reactor thereby facilitating the use of a demister separator and also reducing the possibility of fouling of the separator resulting in a more efficient operation.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (for example, type DPV P8X). This type of separator uses the coalescence of liquid droplets on a baffle arrangement to separate the liquid from the gas. A large liquid reservoir is provided in the bottom of the separator for collection of the liquid. The liquid reservoir enables the liquid to be stored thereby providing control over the discharge of the liquid from the separator. This type of separator is very efficient and gives 100% separation of condensed liquid from the gas stream.

If desired, a filter mesh, or other suitable means, may be arranged in the liquid reservoir of the separator to collect any remaining fines present in the separated liquid. Alternatively, any fines may be kept in suspension and thus avoid fouling of the separator by, for example, stirring the liquid in the separator (mechanical agitation), bubbling a gaseous stream through the liquid or continuously circulating the liquid by means of an external loop i.e. liquid is continuously withdrawn from and returned to the separator. Preferably, a portion of the liquid in the separator is continuously circulated by means of a pump. Suitably, sufficient liquid is circulated to allow the pump to be operated in a continuous manner. A portion of the circulating liquid may be introduced directly into the fluidised bed via a valve which opens to allow liquid to enter a supply line to the nozzle(s). Preferably, the valve is operated via a liquid level controller which monitors and maintains the level of liquid in the separator between set limits.

The separated liquid is suitably introduced into the fluidised bed via nozzle(s) arranged above the upper limit of the temperature gradient between the entering fluidising gas and the remainder of the bed. The nozzle(s) may be at a plurality of points within this region of the fluidised bed and these may be at different heights within this region. The nozzle(s) are arranged such that the local concentration of liquid does not adversely affect the fluidisation of the bed or the quality of the product, and to enable the liquid to disperse rapidly from each point and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid can, if desired, be introduced into the fluidised bed via nozzles located at different heights within the bed. Such a technique can facilitate improved control over comonomer incorporation. Controlled metering of liquid into the fluidised bed via the nozzles provides useful additional control over the temperature profile of the bed and, in the case that the liquid contains comonomer, provides useful control over the comonomer incorporation into the copolymer.

In order to gain the maximum benefit of the cooling of the separated liquid it is essential that the nozzle(s) are above the region where this temperature gradient exists, i.e. in the part of the bed which has substantially reached the temperature of the gaseous recycle stream leaving the reactor.

The nozzle(s) may for example be approximately 20–200 cm, preferably 50–70 cm above the fluidisation grid.

In practice, the temperature profile within the fluidised bed may first be determined during polymerisation using, for example, thermocouples located in or on the walls of the reactor. The nozzle(s) is/are then arranged to ensure that the liquid enters into the region of the bed at which the returned gas stream has substantially reached the temperature of the gaseous recycle stream being withdrawn from the reactor.

It is important to ensure that the temperature within the fluidised bed is maintained at a level which is below the sintering temperature of the polyolefin constituting the bed.

The gas from the separator is recycled to the bed, normally into the bottom of the reactor. If a fluidisation grid is employed, such recycle is normally to the region below the grid, and the grid facilitates uniform distribution of the gas to fluidise the bed. The use of a fluidisation grid is preferred.

The process of the present invention is operated with a gas velocity in the fluidised bed which must be greater than or equal to that required to achieve a bubbling bed. The minimum gas velocity is generally 6–12 cm/sec but the process of the present invention is preferably carried out using a gas velocity in the range 30 to 100, most preferably 50 to 70 cm/sec.

If desired, liquid or liquid-soluble additives, for example, activators, cocatalysts and the like, can be introduced into the bed via the nozzle(s) together with the separated liquid.

In the case that the process of the present invention is employed to make ethylene homo- or copolymers, make-up ethylene, for example, to replace the ethylene consumed during the polymerisation, may be advantageously introduced into the separated gas stream prior to its reintroduction into the bed (for example below the fluidisation grid if such is employed).

The separated liquid stream may be subjected to additional cooling (e.g. using refrigeration techniques) before being introduced into the fluidised bed via the nozzle(s). An advantage of this particular aspect of the present invention is that, by cooling the liquid before introduction into the fluidised bed via the nozzle(s), any tendency for catalyst or prepolymer which may be contained in the liquid stream to cause polymerisation before introduction into the bed will be reduced.

Before commencing the introduction of liquid by use of the process according to the present invention the gas phase fluidised bed polymerisation is started by charging the bed with particulate polymer particles, and then initiating the gas flow through the bed.

According to a further embodiment of the present invention there is provided a process for the injection of liquid into a fluidised bed which comprises:

(a) pressurising the liquid;
(b) feeding the pressurised liquid to a liquid inlet of a nozzle; and
(c) discharging the liquid into the fluidised bed through an outlet of the nozzle in which the liquid is atomised using a mechanical device positioned within the outlet and an atomised spray is formed within a spray-forming zone of the outlet.

According to yet a further embodiment of the present invention there is provided a nozzle suitable for use for the injection of liquid into a fluidised bed said nozzle comprising:

(a) a pressurised liquid inlet; and
(b) a liquid outlet in which a mechanical device is provided within the liquid outlet to atomise the liquid and the liquid outlet is provided with a spray-forming zone.

The liquid outlet, mechanical device and the spray-forming zone may have the features described above.

Nozzles according to the present invention will be further illustrated with reference to FIGS. 1 to 3, and 5 to 9.

Figure 1:
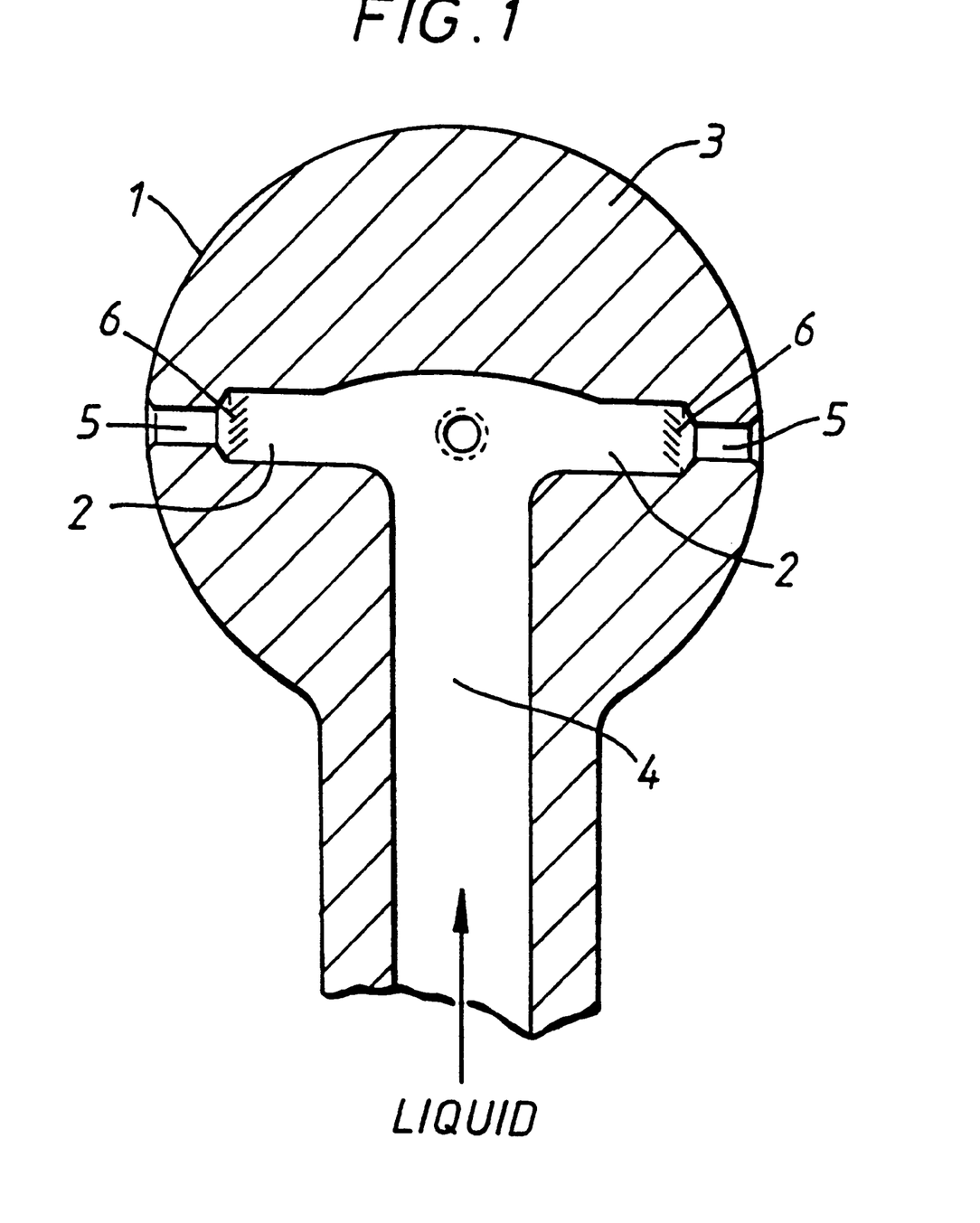
FIG. 1 shows a nozzle of the invention having four outlets.

FIG. 1 represents a nozzle 1 which is provided with typically four outlets 2 arranged equally spaced around the circumference of the head region 3 of the nozzle. Pressurised liquid is provided to the nozzle by an inlet (not shown) which is in communication with a centrally located conduit 4 to the head region 3 of the nozzle where it passes via the outlets 2 and spray-forming zones 5 into the fluidised bed. Each outlet is provided with a mechanical device 6 to atomise the liquid.

Figure 2:
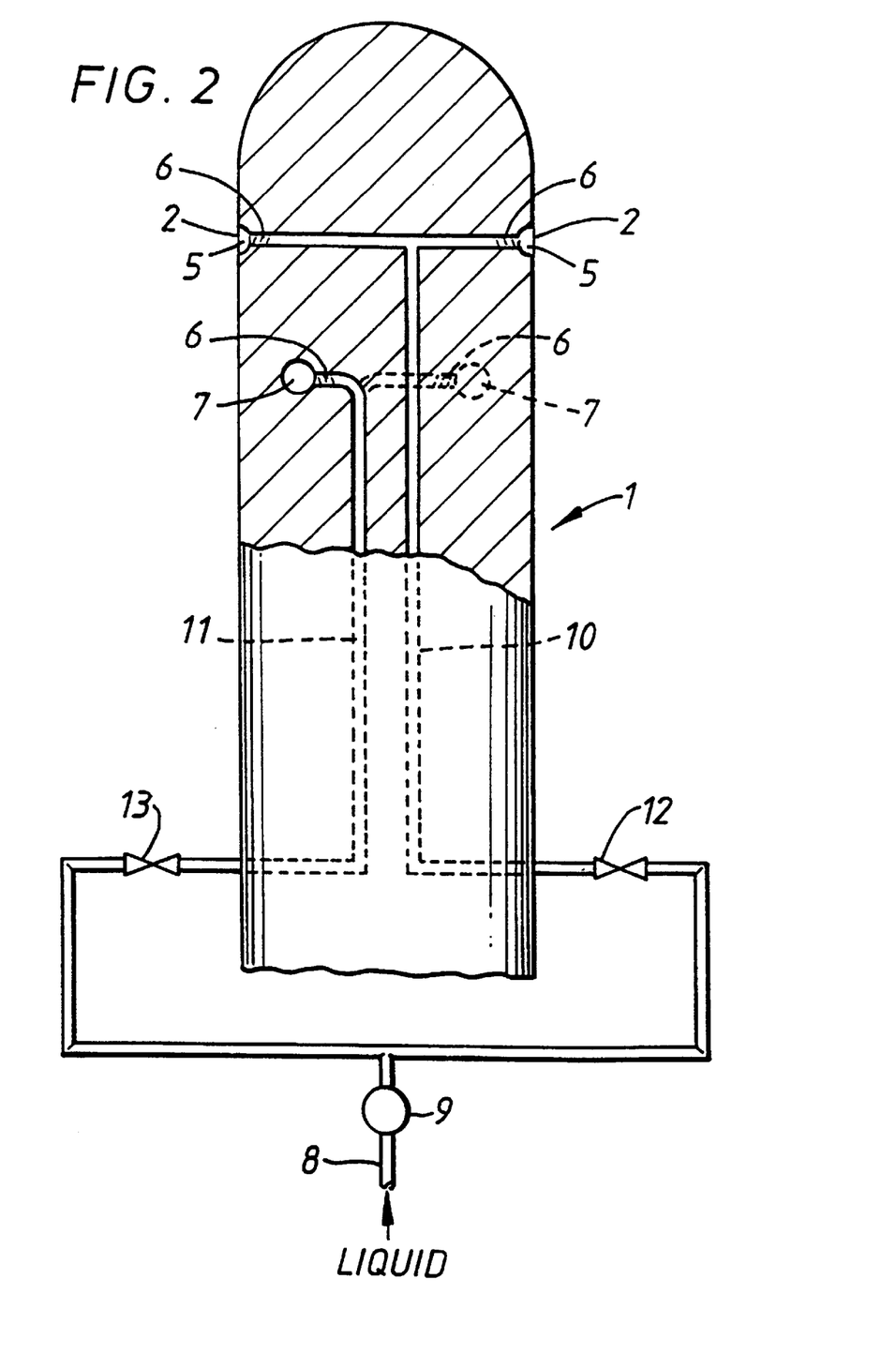
FIG. 2 shows a nozzle of the invention having two groups of outlets offset from one another.

FIG. 2 represents a nozzle 1 provided with two groups of outlets 2 and 7 in which the lower group is arranged offset from the upper group. Pressurised liquid is provided to the nozzle via line 8 and controlled by pump 9. Each group of outlets is provided with a separate supply of the pressurised liquid via lines 10 and 11. The supply of liquid to each group of outlets is controlled by valves 12 and 13. Each outlet is provided with a mechanical device 6 and a spray-forming zone 5.

Figure 3:
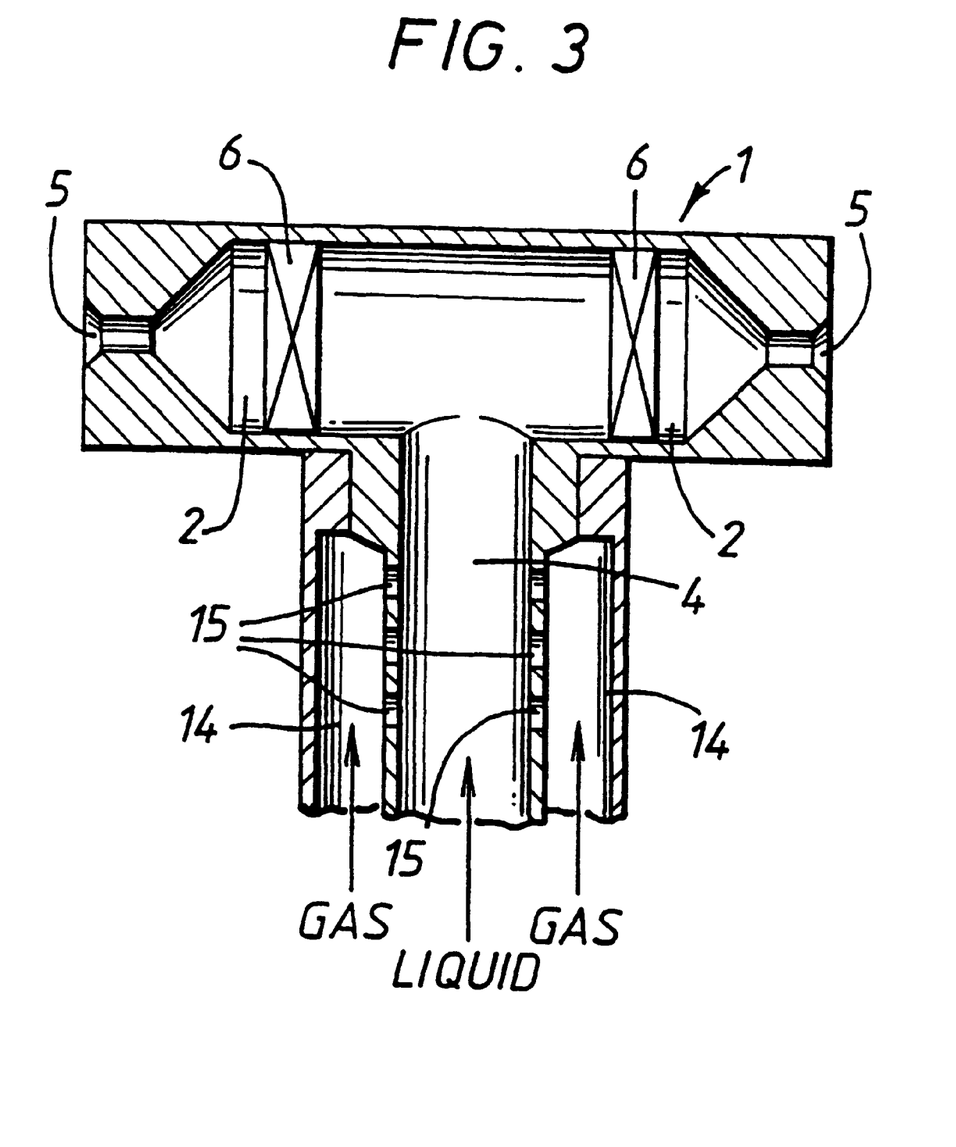
FIG. 3 shows an effervescent nozzle.

FIG. 3 represents an effervescent nozzle. The nozzle 1 is provided with outlets 2. Pressurised liquid is provided to the nozzle by an inlet (not shown) which is in communication with a centrally located conduit 4. Gas is provided to the nozzle via conduit 14 and passes into the pressurised liquid via openings 15. Each outlet is provided with a mechanical device 6 and a spray-forming zone 5.

A polymerisation process according to the present invention will be further illustrated with reference to FIG. 4.

Figure 4:
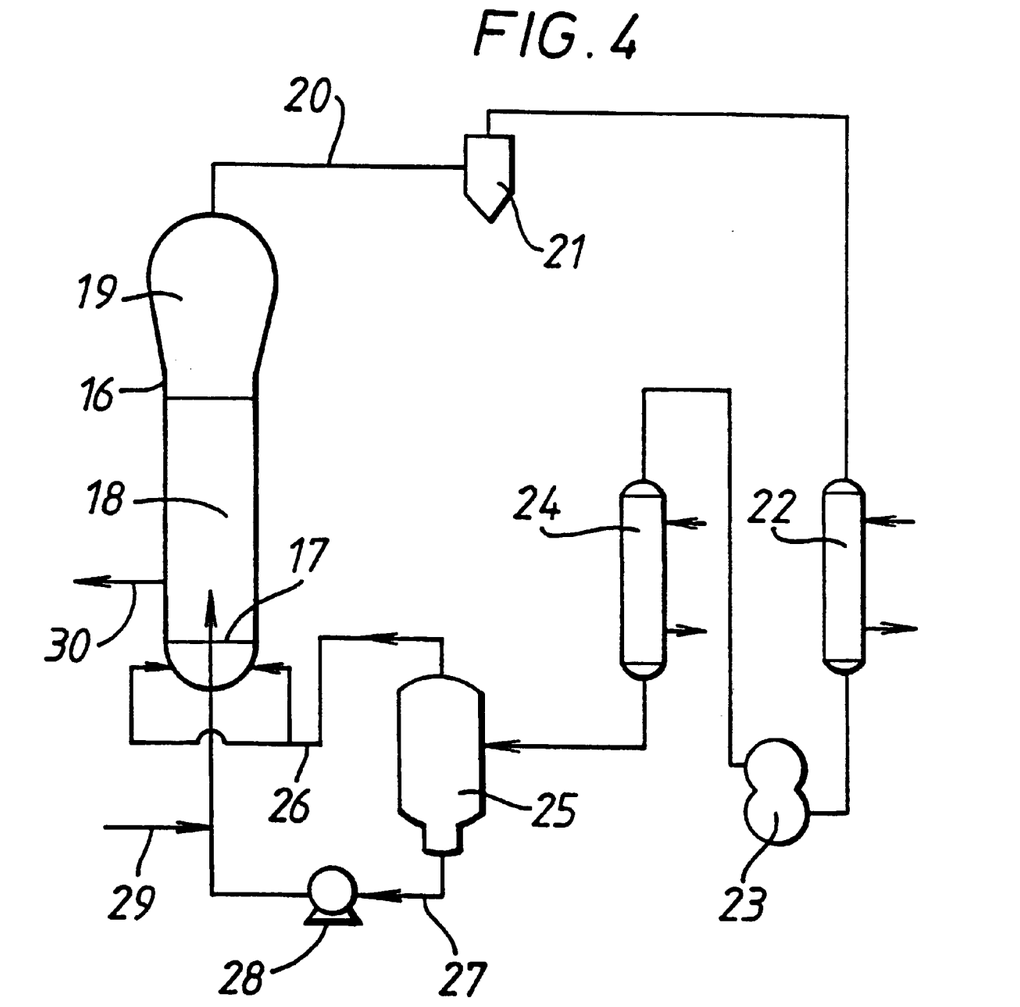
FIG. 4 illustrates a continuous gas fluidized bed polymerization process according to the present invention.

FIG. 4 illustrates a gas-phase fluidised bed reactor consisting essentially of a reactor body 16 which is generally an upright cylinder having a fluidisation grid 17 located in its base. The reactor body comprises a fluidised bed 18 and a velocity reduction zone 19 which is generally of increased cross-section compared to the fluidised bed.

The gaseous reaction mixture leaving the top of the fluidised bed reactor constitutes recycle gaseous stream and is passed via line 20 to a cyclone 21 for the separation of the majority of the fines. Removed fines may suitably be returned to the fluidised bed. The recycle gaseous stream leaving the cyclone passes to a first heat exchanger 22 and a compressor 23. A second heat exchanger 24 is present to remove the heat of compression after the recycle gaseous stream has passed through the compressor 23.

The heat exchanger or exchangers can be arranged either upstream or downstream of the compressor 23.

After cooling and compression to a temperature such that a condensate is formed, the resultant gas-liquid mixture is passed to the separator 25 where the liquid is removed.

The gas leaving the separator is recycled via line 26 to the bottom of the reactor 16. The gas is passed via the fluidisation grid 17 to the bed thereby ensuring that the bed is maintained in a fluidised condition.

The separated liquid from the separator 25 is passed via line 27 to the reactor 16 where the liquid is introduced into the reactor 16 via a nozzle according to the present invention. If necessary a pump 28 may be suitably located in line 27.

Catalyst or prepolymer are fed to the reactor via line 29 into the separated liquid stream.

Product polymer particles may be suitably removed from the reactor via line 30.

The arrangement shown in FIG. 4 is particularly suitable for use when retrofitting existing gas phase polymerisation reactors using fluidised bed processes.

FIGS. 5, 6, 7, 8 and 9 illustrates nozzles, or parts thereof in accordance with the present invention having a variety of characteristics.

Figure 5:
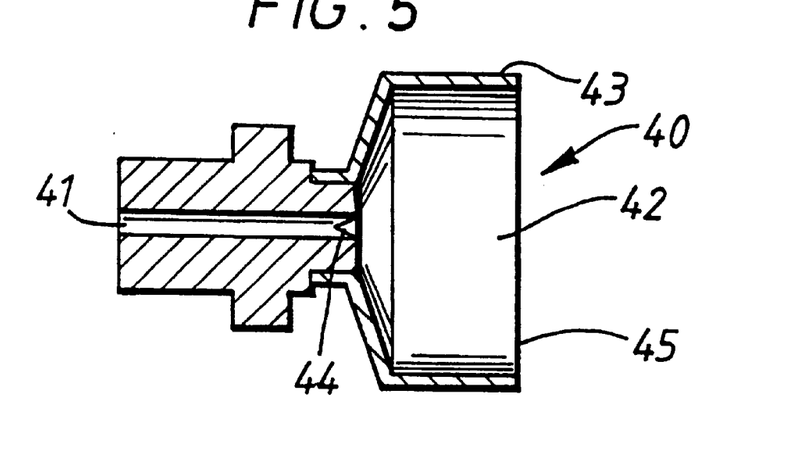
FIGS. 5, 6, 7, 8 and 9 illustrate various nozzles in accordance with the present invention having a variety of characteristics.

FIG. 5 shows a vertical cross-section of a nozzle 40 in the plane of the axis of a conduit 41 of circular cross-section for pressurised liquid. A spray-forming zone 42 is contained generally within a cylindrical housing 43. The end 44 of the conduit is machined to provide a fan-type exit which, when viewed end-on, has an elliptical appearance. The combination of the liquid pressure and the geometry of the end 44 provide the mechanical device for generating a spray. The housing 43 shields the spray-forming zone allowing the spray to develop before it emerges substantially horizontally through outlet 45 into the fluidised bed (not shown).

Figure 6:
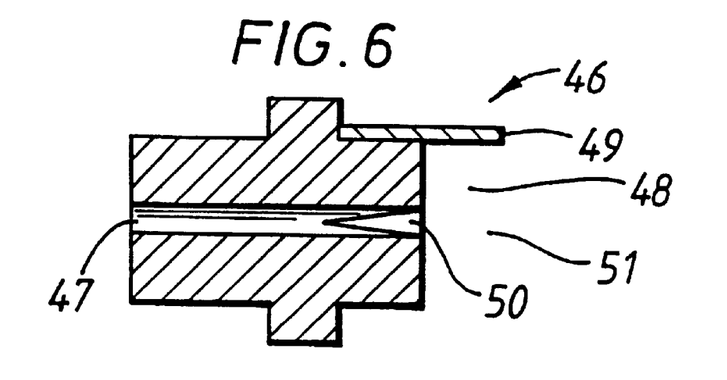

FIG. 6 shows a vertical cross-section of a nozzle 46 in the place of the axis of a conduit 47 of circular cross-section for pressurised liquid and a spray-forming zone 48 which is shielded from the fluidised bed (not shown) by a horizontally disposed plate 49. The end 50 of the conduit is machined to provide a fan-type exit which, when viewed end-on, has an elliptical appearance. The combination of the liquid pressure and the geometry of the end 50 provide the mechanical device for generating a spray. The plate 49 shields the spray-forming zone 48 allowing the spray to develop before it emerges substantially horizontally through outlet 51 into the fluidised bed.

Figure 7:
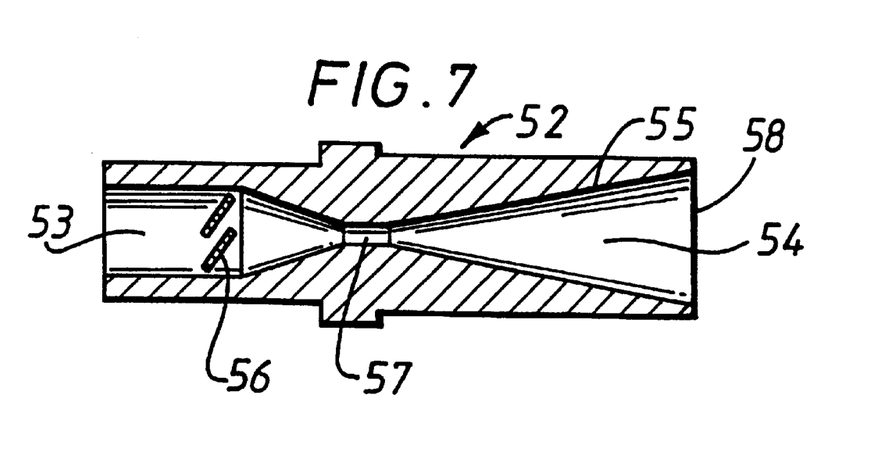

FIG. 7 shows a vertical cross-section of a nozzle 52 in the plane of the axis of a conduit 53 of circular cross-section for pressurised liquid and a spray-forming zone 54 which is shielded from the fluidised bed (not shown) by an integral housing 55 having a conical internal cross-section. The nozzle is provided with a baffle system 56 to generate turbulent flow in the liquid. The generation of liquid spray commences at a constriction 57 between conduit 53 and spray-forming zone 54. The combination of the liquid pressure, the constriction 57 and the baffle system 56 provide the mechanical device for generating a spray. The housing 55 shields the spray-forming zone 54 allowing the spray to develop before it emerges substantially horizontally through outlet 58 into the fluidised bed.

Figure 8:
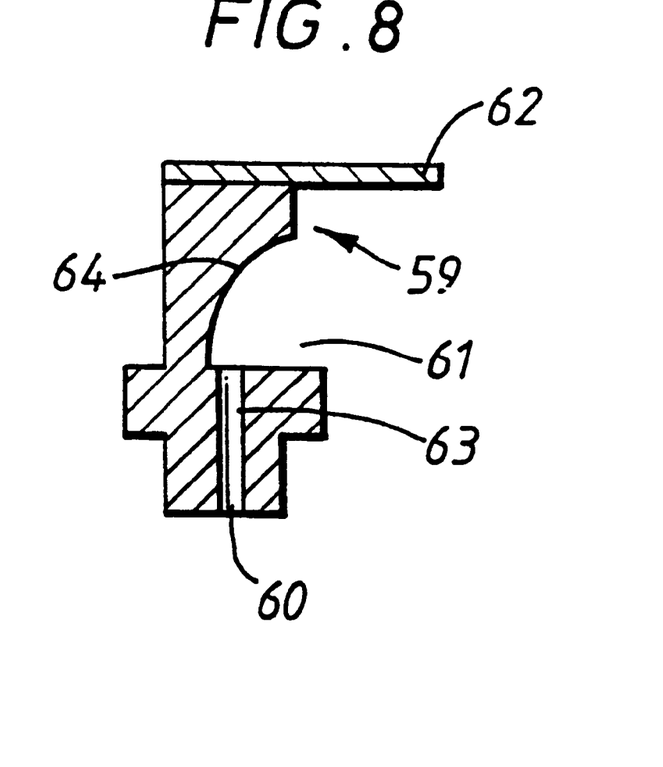

FIG. 8 shows a vertical cross-section of a nozzle 59 in the plane of the axis of a conduit 60 of circular cross-section for pressurised liquid and a spray-forming zone 61 which is shielded from the fluidised bed (not shown) by a horizontally disposed plate 62 and a curved member 64 integral with the nozzle. A vertical jet of liquid (not shown) emerges from the end 63 of conduit 60 and impinges on the curved surface 64 thereby generating a spray of the liquid. The spray is shielded by the spray-forming zone 61 allowing the spray to develop before it emerges substantially horizontally into the fluidised bed.

Figure 9:
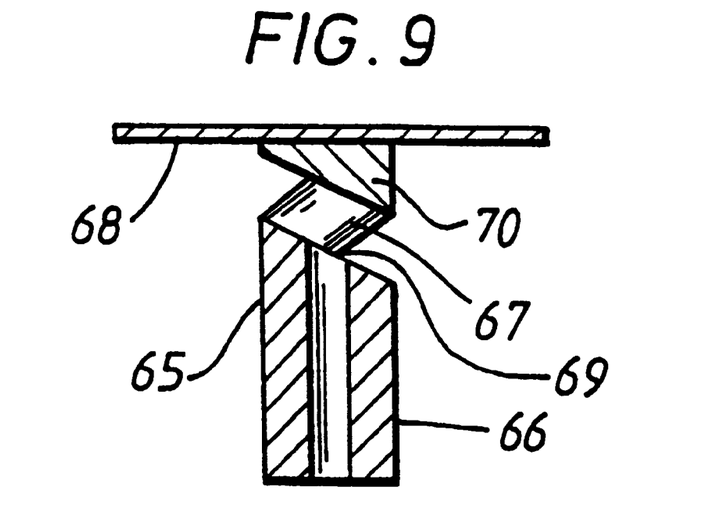

FIG. 9 shows a vertical cross-section of a nozzle 65 in the plane of the axis of a conduit 66 of circular cross-section for pressurised liquid and a spray-forming zone 67 which is shielded from the fluidised bed (not shown) by a horizontally disposed plate 68 and an integral helical extension 70 of the nozzle. A vertical jet of liquid (not shown) emerges from the end 69 of conduit 66 and impinges partly on the helical extension 70 and partly on the plate thereby generating a spray of the liquid. The spray is shielded by the spray-forming zone 67 allowing the spray to develop before it emerges substantially horizontally around the helical extension 70 into the fluidised bed.

What is claimed is:

1. A continuous gas fluidised bed process for the polymerisation of olefin monomer selected from (a) ethylene, (b) propylene, (c) mixtures of ethylene and propylene and (d) one or more other alpha-olefins mixed with (a), (b) or (c), in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing at least part of the separated liquid directly into the fluidised bed by:

(a) pressurising the liquid;
   (b) feeding the pressurised liquid to a liquid inlet of a nozzle; and
   (c) discharging the liquid into the fluidised bed through an outlet of the nozzle in which the liquid is atomised using a mechanical device positioned within the outlet and an atomised spray is formed within a spray-forming zone of the outlet.

2. A process as claimed in claim 1 wherein the spray-forming zone of the outlet is located within the nozzle.

3. A process as claimed in claim 1 wherein the spray-forming zone is defined by a wall which is an integral part of the nozzle, or which protrudes from the nozzle, or which is secured in spatial relationship to the nozzle.

4. A process as claimed in claim 3 wherein the wall comprises a tube or a plate.

5. A process as claimed in one of claims 1 to 4 wherein the nozzle is positioned within the fluidised bed and has 2 to 4 outlets.

6. A process as claimed in one of claims 1 to 4 wherein the outlet is a slot having an elliptical shape.

7. A process as claimed in one of claims 1 to 4 wherein the fluidised bed reactor is provided with a plurality of nozzles.

8. A process as claimed in one of claims 1 to 4 wherein the nozzle has a series of outlets arranged in groups circumferentially around the nozzle.

9. A process as claimed in claim 8 wherein the groups of outlets are arranged in a number of rows around the circumference of the nozzle.

10. A process as claimed in claim 8 wherein each group of outlets is connected separately to a supply of pressurised liquid.

11. A process as claimed in one of claims 1 to 4 wherein the atomised liquid spray is injected into the bed in a substantially horizontal direction.

12. A process as claimed in one of claims 1 to 4 wherein the nozzle has a liquid flux rate in the range 9.5 to 70 m liquid/s/m$^3$ outlet cross-sectional area wherein the nozzle liquid flux rate is defined as the volumetric flow rate of liquid (m$^3$/s) per unit cross-sectional area (m$^2$).

13. A process as claimed in one of claims 1 to 4 wherein a small amount of gas is introduced into the liquid before the liquid passes through the mechanical device.

14. A process as claimed in claim 13 wherein the amount of gas is in the range 0.5 to 10 percent by weight, based on the total weight of gas and liquid passing through the nozzle.

15. A process as claimed in one of claims 1 to 4 wherein the catalyst is an activated transition metal based metallocene catalyst.

16. A process for the injection of liquid into a fluidised bed which comprises:
   (a) pressurising the liquid;
   (b) feeding the pressurised liquid to a liquid inlet of a nozzle; and
   (c) discharging the liquid into the fluidised bed through an outlet of the nozzle in which the liquid is atomised using a mechanical device positioned within the outlet and an atoinised spray is formed within a spray-forming zone of the outlet.

* * * * *